Sept. 10, 1935.  L. SMIDTH  2,013,702
METHOD OF MOLDING UREA FORMALDEHYDE CONDENSATION PRODUCTS
Filed Feb. 25, 1931
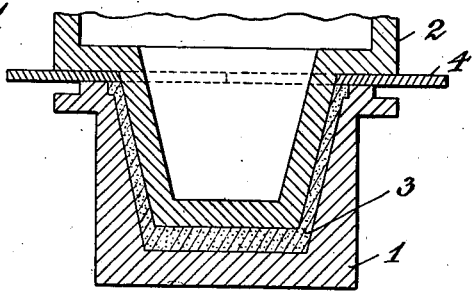
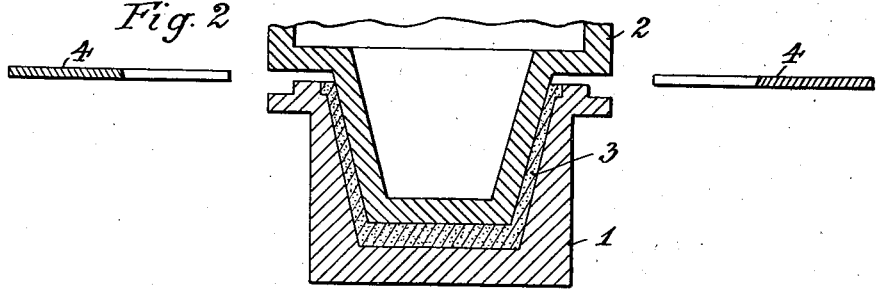
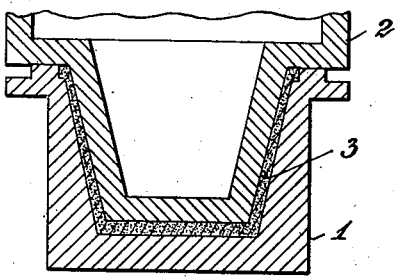
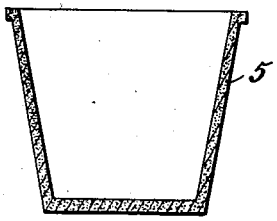
INVENTOR
BY
ATTORNEYS Patented Sept. 10, 1935

2,013,702

UNITED STATES PATENT OFFICE 2,013,702

METHOD OF MOLDING UREA FORMALDE-HYDE CONDENSATION PRODUCTS

Leonard Smidth, New York, N. Y., assignor to Aldur Corporation, Brooklyn, N. Y., a corporation of New York Application February 25, 1931, Serial No. 518,070

6 Claims. (Cl. 18—55)

It is well known that urea formaldehyde molding compositions as heretofore employed when subjected to heat and pressure are of less plasticity than the phenolic-formaldehyde molding compositions and consequently require a considerably greater molding pressure. In fact this excess molding pressure is in the neighborhood of two thousand pounds per square inch, it being usual to mold the urea formaldehyde molding compositions by the application of a pressure of aproximately four thousand pounds per square inch and the phenolic molding compositions by the application of a pressure of approximately two thousand pounds per square inch. This excess pressure, normally required for the urea formaldehyde molding compositions, not only limits the production but is also detrimental to the mold, due to the wear and tear on the die and the strain on the mold, due to this excess pressure.

In molding urea formaldehyde compositions it has been usual to first completely close the mold on the composition; then open the mold and leave it open for a short time to permit the escape of the gas from the composition; and finally to reclose the mold for completing the molding operation.

The chemical reactions of the urea formaldehyde molding compositions are quite different from those involved in the phenolic-formaldehyde compositions. In the latter the phenol condenses with the formaldehyde, to form an intermediate product with the loss of water. This intermediate product, with the application of heat, is converted into an infusible and insoluble final product, without the loss of water. It is this second reaction that takes place during the hot molding in which the phenolic formaldehyde molding composition is converted into the infusible and insoluble form.

In urea formaldehyde molding compositions the urea condenses with the formaldehyde to give an intermediate condensation product and this intermediate condensation product, upon the application of heat, is transformed into a final infusible and insoluble product with a loss of water. In this case it is in the second reaction, during the hot pressing operation, that the water is lost. In other words, the reaction takes place in the mold in the case of the phenolic-formaldehyde molding compositions without giving off water whereas in the case of the urea formaldehyde molding compositions it is probably a chemical reaction in which the water is eliminated.

Normally as the process has heretofore been practiced, in order to obtain satisfactory hot moldings of the urea formaldehyde molding compositions, it is necessary that the reaction be taken nearer completion than in the phenolic-formaldehyde molding compositions so as to have the water which is eliminated by the unreacted material at a minimum. The reason for this is that when a mold is closed on a urea formaldehyde condensation product and then reopened to allow the gas in it to escape and is then reclosed, this gas is largely water vapor and occupies a certain volume so that when the mold is reclosed there is not sufficient material therein to make a perfect product. Therefore, it has been customary up to the present time to use a less plastic material for the urea formaldehyde condensation products, viz., one that requires above four thousand pounds per square inch pressure whereas the phenolic-formaldehyde products require only about two thousand pounds per square inch pressure. On this less plastic urea formaldehyde molding composition the reaction has gone nearer to completion and the amount of water given off is at a minimum so that it is possible to mold a perfect product. Also, it is more difficult to close the mold on the material as there is present a slight excess of the material to make up for the loss of the water vapor given off during the "gassing" operation.

The object of my invention is to successfully utilize urea formaldehyde molding compositions at much lower pressures than it has heretofore been thought possible and comparable with the molding pressures used for the phenolic-formaldehyde molding compositions. In the practice of the present invention it is not necessary that the reaction be brought as near completion as is the practice in the prior art requiring about 4,000 pounds per square inch to mold the product without leading to prohibitive shrinkage. Since the reaction has not been brought as near completion, the material contains more water and is more plastic, and can be molded by the present process to produce perfect products using only about 2,000 pounds per square inch.

I have discovered that this can be done by first partially closing the mold with a spacing means interposed between the mold members to close the space between their normal meeting faces; then opening the mold and removing the spacing means to permit the escape of the gas from the molding composition, allowing the mold to remain open for a limited period, say for about thirty seconds, to permit the material to stiffen; and then closing the mold to complete the molding operation.

The period during which the mold is left open permits the composition to become sufficiently stiff such that the final pressure will force it further into the mold rather than out of the mold between the rims of the two mold members, thereby to obtain a molded product of uniform density. By this method when the mold is finally closed there is enough material left therein to completely fill the mold and produce a perfect product.

It should be understood that where I use the term "urea" herein I intend to include not only urea but thiourea and their derivatives.

The steps of my process are illustrated in the accompanying drawing, in which:

Fig. 1 represents a vertical section through a mold with the parts in the positions they assume during the first step of the molding operation in which the mold is partially closed with a spacing means interposed between the mold members;

Fig. 2 represents a similar view showing the parts in the positions they assume during the second step of the process where the mold is opened and the spacing means removed to permit the "gassing" of the molding composition and allowing the material to stiffen;

Fig. 3 represents a similar view showing the third step in the process in which the mold is closed to complete the molding operation; and Fig. 4 represents a vertical section through the molded article after it has been removed from the mold.

The lower mold member is denoted by 1, the upper mold member by 2, the molding composition by 3, the interposed spacing means by 4 and the molded article by 5. The spacing means 4 may be in any suitable form which will close the space between the normal meeting faces of the mold members, such for instance as an annular divided shim. It is obvious that a molding press of any well known or approved form may be used for applying the proper amount of heat and pressure to the composition to be molded.

What I claim is:—

1. The method of molding urea formaldehyde molding compositions by the application of heat and pressure which consists in introducing into the mold such composition in a sufficiently plastic condition to be moldable at pressures lower than about four thousand pounds per square inch, applying the pressure to the composition by partially closing the mold, then "gassing" by releasing the pressure and opening the mold, and prior to finally completely closing the mold, allowing the material to remain a sufficient time in order to stiffen then finally closing the mold.

2. The method of molding urea formaldehyde molding compositions by the application of heat and pressure which consists in introducing into the mold such composition in a sufficiently plastic condition to be moldable at pressures lower than about four thousand pounds per square inch, applying a comparatively low pressure to the composition by partially closing the mold, then "gassing" by releasing the pressure and opening the mold, and prior to finally completely closing the mold, allowing the material to remain a sufficient time in order to stiffen then finally closing the mold.

3. The method of molding urea formaldehyde molding compositions by the application of heat to the composition by pressure which consists in introducing into the mold such composition in a sufficiently plastic condition to be moldable at pressures lower than about four thousand pounds per square inch, applying pressure and partially closing the mold members on an interposed spacing means, then releasing the pressure, opening the members and removing the spacing means, thus permitting the material to "gas", and prior to finally completely closing the mold, allowing the material to remain a sufficient time in order to stiffen then finally closing the mold.

4. The method of molding urea formaldehyde molding compositions by the application of heat and pressure which consists in introducing into the mold such composition in a sufficiently plastic condition to be moldable at pressures lower than about four thousand pounds per square inch, introducing a spacing means between the normal meeting faces of the mold members, then applying pressure to the composition by closing the mold members on said spacing means, then removing the pressure, opening the mold members and removing the spacing means, thus permitting the material to "gas", and prior to finally completely closing the mold, allowing the material to remain a sufficient time in order to stiffen then finally closing the mold.

5. The method for heat and pressure molding of urea formaldehyde molding compositions, comprising introducing such composition while containing sufficient water which if molded at a pressure comparable to 2,000 pounds per square inch as is used for phenol formaldehyde molding compositions by the conventional simple molding procedure would produce imperfect products due to shrinkage, then applying pressure to the composition by partially closing the mold upon a suitable spacing means, then gassing the mold by releasing the pressure and opening the mold, leaving the mold open a sufficient time to stiffen the material, and thereafter closing the mold and applying upon the stiffened material a pressure much lower than 4,000 pounds per square inch and comparable to 2,000 pounds per square inch.

6. The method for molding urea formaldehyde molding compositions under heat and pressure comprising introducing into a mold such composition in a condition which is so plastic that if the molding were effected by simple closing and opening with or without "gassing", the composition would shrink and produce imperfect products, applying pressure to the composition by partially closing the mold, then "gassing" the mold by releasing the pressure, before finally applying the pressure allowing the composition to stiffen, and thereafter applying a pressure considerably lower than 4,000 pounds per square inch.

LEONARD SMIDTH.